(12) United States Patent
Henry

(10) Patent No.: US 9,093,912 B2
(45) Date of Patent: Jul. 28, 2015

(54) METHOD AND APPARATUS FOR SOFT SWITCHING WELDING TYPE POWER

(71) Applicant: Andrew Joseph Henry, Appleton, WI (US)

(72) Inventor: Andrew Joseph Henry, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 10 days.

(21) Appl. No.: 13/844,365

(22) Filed: Mar. 15, 2013

(65) Prior Publication Data

US 2014/0268893 A1 Sep. 18, 2014

(51) Int. Cl.
| | |
|---|---|
| *H02M 3/156* | (2006.01) |
| *H02M 1/00* | (2006.01) |
| *H02M 1/34* | (2007.01) |
| *B23K 9/10* | (2006.01) |
| *H02M 1/42* | (2007.01) |

(52) U.S. Cl.
CPC ............... *H02M 1/34* (2013.01); *B23K 9/1006* (2013.01); *H02M 1/4225* (2013.01); *H02M 3/156* (2013.01); *H02M 2001/007* (2013.01); *H02M 2001/0058* (2013.01); *Y02B 70/1491* (2013.01)

(58) Field of Classification Search
CPC ................ H02M 1/34; H02M 1/4225; H02M 2001/0058; H02M 2001/007; H02M 3/156
USPC .............. 363/16–17, 84–89, 95–98, 125–136
See application file for complete search history.

(56) References Cited

U.S. PATENT DOCUMENTS

| | | | | | |
|---|---|---|---|---|---|
| 4,876,433 | A | * | 10/1989 | Kashima et al. | 219/130.51 |
| 5,535,114 | A | * | 7/1996 | Horie et al. | 363/58 |
| 5,570,279 | A | * | 10/1996 | Venkataramanan | 363/127 |
| 5,691,890 | A | * | 11/1997 | Hyde | 363/89 |
| 5,740,022 | A | * | 4/1998 | Abe | 363/39 |
| 5,815,386 | A | * | 9/1998 | Gordon | 363/50 |
| 5,841,268 | A | * | 11/1998 | Mednik | 323/222 |
| 5,874,826 | A | * | 2/1999 | Chen et al. | 323/222 |
| 5,991,180 | A | * | 11/1999 | Vogel et al. | 363/89 |
| 6,115,273 | A | * | 9/2000 | Geissler | 363/89 |
| 6,169,671 | B1 | * | 1/2001 | Mao | 363/53 |
| 6,329,636 | B1 | * | 12/2001 | Geissler | 219/130.1 |
| 6,426,888 | B2 | * | 7/2002 | Geissler | 363/89 |
| 6,625,046 | B2 | * | 9/2003 | Geissler | 363/89 |
| 6,750,427 | B1 | * | 6/2004 | DeCoster | 219/130.21 |
| 6,865,096 | B1 | * | 3/2005 | Geissler | 363/89 |
| 6,987,242 | B2 | * | 1/2006 | Geissler | 219/130.1 |
| 7,336,512 | B2 | * | 2/2008 | Geissler | 363/89 |
| 7,778,056 | B2 | * | 8/2010 | Geissler | 363/89 |
| 8,378,647 | B2 | * | 2/2013 | Yonezawa et al. | 323/222 |
| 8,581,147 | B2 | * | 11/2013 | Kooken et al. | 219/137.7 |
| 8,785,816 | B2 | * | 7/2014 | Kooken et al. | 219/130.1 |
| 2002/0047000 | A1 | * | 4/2002 | Geissler | 219/137 PS |
| 2004/0233682 | A1 | * | 11/2004 | Geissler | 363/16 |
| 2005/0180175 | A1 | * | 8/2005 | Torrey et al. | 363/17 |
| 2005/0180176 | A1 | * | 8/2005 | Coulibaly | 363/17 |

(Continued)

OTHER PUBLICATIONS

International Search Report and Written Opinion, Sep. 12, 2014, European Patent Office, 2280 Rijswijk, Netherlands.

*Primary Examiner* — Timothy J Dole
*Assistant Examiner* — Yusef Ahmed
(74) *Attorney, Agent, or Firm* — George R. Corrigan

(57) ABSTRACT

A method and apparatus for providing welding type power is disclosed. It includes having a switched preregulator, where the preregulator is soft switched, and the components used to implement the soft switching are protected.

10 Claims, 3 Drawing Sheets

(56) References Cited

U.S. PATENT DOCUMENTS

| | | | |
|---|---|---|---|
| 2006/0138112 A1* | 6/2006 | Geissler | 219/130.1 |
| 2007/0051712 A1* | 3/2007 | Kooken et al. | 219/130.1 |
| 2009/0230941 A1* | 9/2009 | Vogel | 323/305 |
| 2010/0006551 A1* | 1/2010 | Geissler et al. | 219/130.1 |
| 2010/0309697 A1* | 12/2010 | Werle et al. | 363/126 |
| 2012/0039092 A1* | 2/2012 | Xu et al. | 363/17 |

* cited by examiner

METHOD AND APPARATUS FOR SOFT SWITCHING WELDING TYPE POWER

FIELD OF THE INVENTION

The present disclosure relates generally to the art of providing welding type power. More specifically, it relates to providing welding type power using a preregulator and a converter.

BACKGROUND OF THE INVENTION

There are many known types of welding-type power supplies that provide welding type power. Welding type power, as used herein, refers to power suitable for electric arc welding, plasma arc cutting or induction heating. Welding-type power supply, as used herein, refers to a power supply that can provide welding type power. Welding type systems are used to perform a variety of processes and used in a variety of settings. Welding-type system, as used herein, is a system that can provide welding type power, and can include control and power circuitry, wire feeders, and ancillary equipment.

Some welding type systems include a preregulator which provides a dc bus, followed by a converter based output circuit. The preregulator conditions the input power, and provides a known dc bus. The inverter based output circuit receives the bus and provides the welding type power as an output. One successful design includes a boost circuit as part of the preregulator, and the output circuit includes an inverter, transformer, rectifier and output inductor. This type of welding type power supply is described in U.S. Pat. No. 6,987,242 (Geissler) and U.S. Pat. No. 6,115,273 (Geissler). Another welding type power supply that has a converter output circuit is described in 20090230941 (Vogel). All three patents are owned by the owner of this patent, and all three of which are hereby incorporated by reference. Other welding type power supplies include additional stages, or use other topologies for each stage (such as a buck preregulator, a combined boost rectifier for a preregulator, a chopper instead of or following the inverter, a second inverter, etc.

Boost preregulators offer many advantages, including the ability to receive a range of inputs, the ability to power factor correct, and the ability to provide a high voltage bus which allows for a smaller output transformer, but they do have some drawbacks. For example, the losses in switches can be significant in a welding power supply, particularly when they are hard switched.

The power loss in a switch at any time is the voltage across the switch multiplied by the current through the switch. Hard switching turn-on losses occur when a switch turns on, with a resulting increase in current through the switch, and it takes a finite time for the voltage across the switch to drop to zero. Soft switching attempts to avoid turn-on losses by providing an auxiliary or snubber circuit with an inductor in series with the switch that limits the current until the transition to on has been completed, and the voltage across the switch is zero. This is referred to as zero-current transition (ZCT) switching.

Similarly, hard switching turn-off losses also occur when a switch turns off, with a resultant rise in voltage across the switch, and it takes a finite time for the current through the switch to drop to zero. Soft switching attempts to avoid turn-off losses by providing an auxiliary or snubber circuit with a capacitor across the switch that limits the voltage across the switch until the transition to off has been completed, and the current through the switch is zero. This is referred to as zero-voltage transition (ZVT) switching.

Often it is not practical or cost effective to use a true ZCT and ZVT circuit. U.S. Pat. No. 6,115,273 (Geissler) describes an approximation using slow voltage/current transitions (SVT and SCT). SVT and SCT as used herein, describe transitions where the voltage or current rise is slowed (rather than held to zero), while the switch turns off or on. While U.S. Pat. No. 6,115,273 teaches an improvement over the prior art, the circuit that is used to provide the SVT and SCT transitions can be stressed during the transitions. Particularly, diode D4 of FIGS. 5-13 is stressed.

Accordingly, a welding type power supply with a preregulator having a switch that with SVT and SCT switching and with protection for the components used perform the SVT and SCT is desirable.

SUMMARY OF THE PRESENT INVENTION

According to a first aspect of the disclosure a method of providing welding type power includes pre-regulating an input line voltage to provide a dc bus and converting the dc bus to a welding type output. The pre-regulating includes SVT and SCT switching a boost convertor. The SVT and SCT switching includes maintaining a boost converter switch off, and allowing current to flow through a boost inductor, a snubber inductor, and a first diode, to the dc bus. Then, the boost converter switch is turned on and current is diverted from the snubber inductor to the switch. Then the current in the snubber inductor is reversed and second capacitor is discharged through a third diode, a first capacitor, and the snubber inductor, thereby transferring energy from the second capacitor to the snubber inductor. Then, current is diverted through a fourth diode, the third diode and the first capacitor when the second capacitor is discharged, thereby transferring energy from the snubber inductor to the first capacitor. Then current is diverted from the first capacitor through a fifth diode and the third diode, thereby increasing the voltage on the second capacitor. The voltage on the second capacitor is allowed to rise until current begins to flow from the snubber inductor to the first capacitor, and then current is diverted from the second capacitor through a third diode to the second diode. Current flowing from the boost inductor to the snubber inductor increases until all of the current from the boost inductor flows into the snubber inductor, and then current is diverted from the first capacitor to the first diode. This is repeated each time the switch is cycled off and on.

Switching the boost convertor includes slowing the switch voltage rise with a capacitor while the switch is turning off, and slowing the switch current rise with an inductor while the switch is turning on according to one alternative.

Converting the dc bus includes inverting the dc bus to an ac signal, transforming the ac signal to a second ac signal, and rectifying the ac signal to produce a welding type signal and/or inverting the welding type signal to produce an ac welding type signal, according to other alternatives.

Preregulating includes receiving the input line voltage and rectifying the input line voltage to produce a rectified input signal, and providing the rectified input signal to the boost circuit in another embodiment.

Other principal features and advantages of will become apparent to those skilled in the art upon review of the following drawings, the detailed description and the appended claims.

Figure 1:
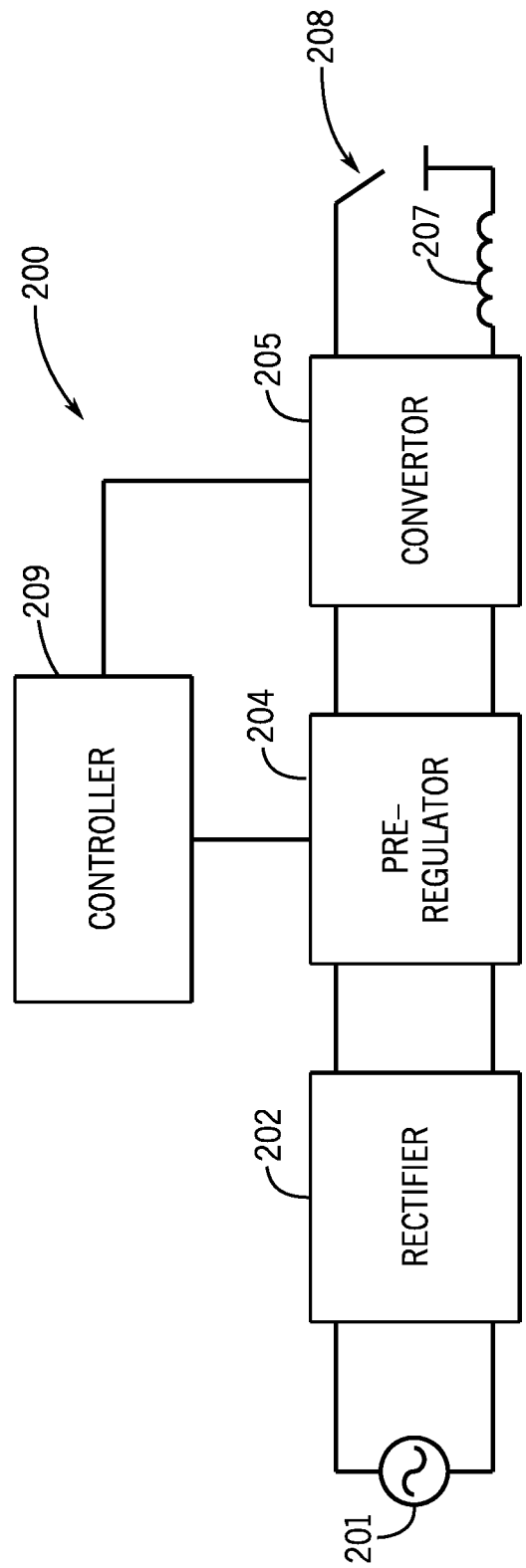
FIG. 1 is diagram of a welding type power supply.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular circuit and a particular system, it should be understood that other circuits and systems may be used.

Generally, the preferred embodiment is implemented with a welding-type system such as that shown in U.S. Pat. No. 6,987,242 and U.S. Pat. No. 6,115,273. It includes a preregulator input circuit that creates an intermediate power signal (preferably a dc bus), an output circuit with an inverter, a transformer, and a rectifier, and a controller. Additionally, in some embodiments an output inverter is provided for ac welding. The output inverter receives the transformed and rectified signal, and provides an ac welding signal. An output inductor is provided, preferably after the inverter. SVT and SCT switching is provided, with protection for the components used to implement the SCT and SCT switching. Alternatives provide for the inductor being before the output inverter, omitting the output inverter, using a chopper, using a buck preregulator, using a combined boost-rectifier preregulator, omitting the boost (and inverting the rectified input).

Input circuit, as used herein, includes the circuitry that receives input power such as rectifiers, filters, preregulators, etc. Intermediate power signal, as used herein, includes the output of the input circuit, and can be a rectified signal, a regulated signal such as the output of a boost or buck converter, or an unregulated dc bus. Output circuit, as used herein, includes the circuitry that provides the welding type signal, and can include inverters, converters, transformers, rectifiers, filters, chokes, etc. Controller, as used herein, is the digital and/or analog circuitry and/or logic/instructions that cooperate to provide control signals to one or more circuits. A controller can be located on a single board, or distributed across multiple locations.

A block diagram of a welding type power supply is shown in FIG. 1. Source 201 represents the input line voltage used to provide power to the welding power supply. The input line voltage may be anywhere between 90 and 250 volts in the preferred embodiment. The voltage typically operates at a frequency of 60 hertz (in the United States) and is single phase in the preferred embodiment (although alternative embodiments use a three phase input). Other voltages may also be used.

The input voltage is provided to a rectifier 202, which may be a simple bridge rectifier. The output of rectifier 202 is a rectified sinusoid. A pre-regulator 204 receives the rectified sinusoid from rectifier 202 and provides a dc bus output to an output inverter 205. An alternative embodiment provides for a combined rectifier-boost.

Pre-regulator 204, in the preferred embodiment is a soft-switched boost convertor which provides close to a unity power factor. Other convertor pr inverter configurations may be used. Pre-regulator 204 also allows the input voltage to be anywhere within a range of input voltages in the preferred embodiment.

Figure 3:
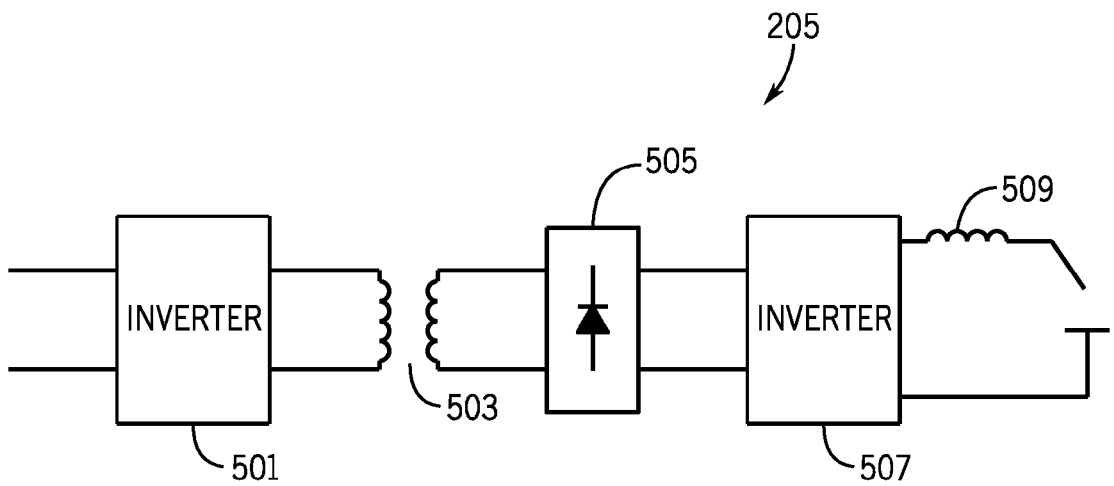
FIG. 3 is a diagram of a welding type power supply output circuit.
Figure 4:
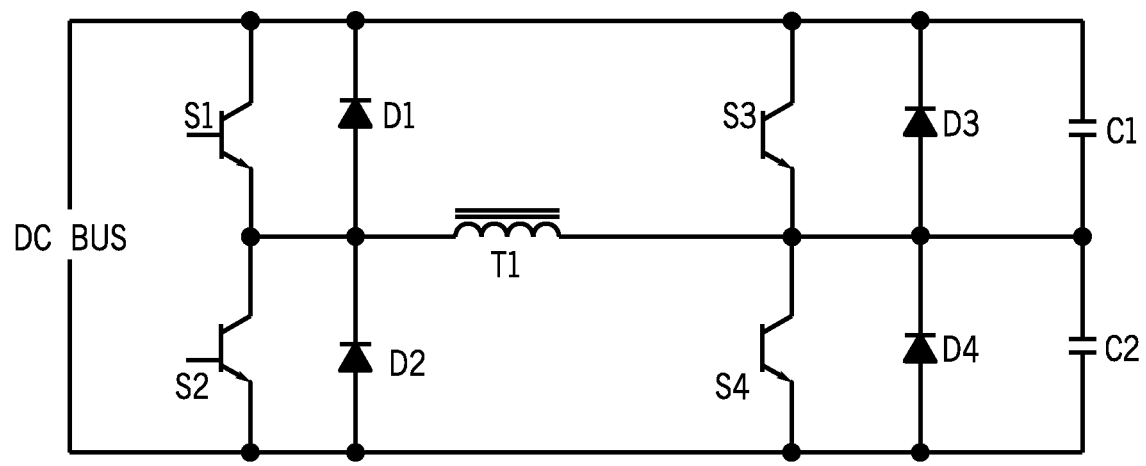
FIG. 4 is a diagram of a full bridge inverter.

Convertor 205, also called an output circuit, is shown in more detail in FIG. 3, and preferably includes a full bridge inverter 501, a transformer 503, an output rectifier 505, a full bridge output inverter 507 and an output inductor 509. Inverters 501 and 507 each include at least four inverter switches. Inverter 501 receives the dc, bus and inverts it to a desired signal using PWM at a frequency of about 20 KHz-40 KHz. The frequency is preferably high enough to keep transformer 503 small. The load is a primary of transformer 503, and the secondary of transformer 503 is rectified to be a welding type output. Output inverter 507 inverts the welding type output to provide an ac welding output. If dc welding is provided output inverter 507 can be turned off (or omitted for only dc welding power supplies). Output inverter 507 preferably operates a welding process frequency of about 20-400 Hz. Alternatives provide that on or both of inverters 501 and 507 be half bridges, or that other topologies are used. Controller 209 controls the switches. FIG. 4 shows a typical full bridge inverter.

Figure 2:
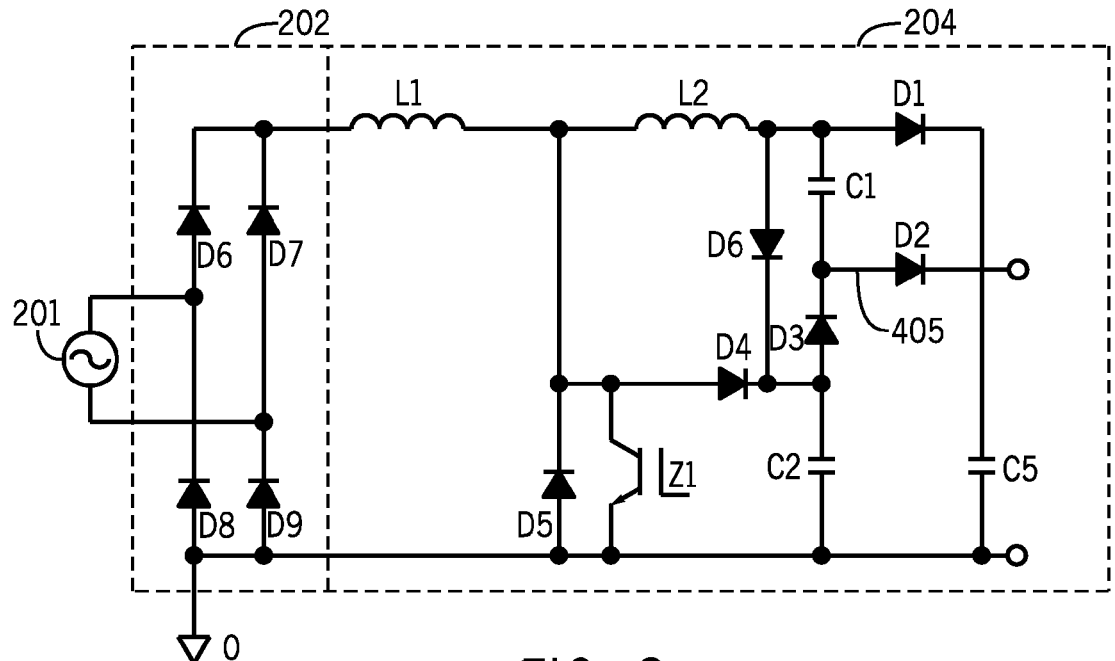
FIG. 2 is a diagram of a welding type power supply boost preregulator with soft switching.

The circuit used in the preferred embodiment to implement pre-regulator 204 is shown in FIG. 2 (along with rectifier 202 and voltage source 201). Rectifier 202 is comprised of diodes D6, D7, D8, and D9, and the boost circuit is comprised of a boost inductor L1 and a boost switch Z1. An anti-parallel diode D5 is connected across switch Z1 to protect switch Z1 during transitions. The portion of the circuit which provides the lossless switching includes a snubber inductor L2 (3.9 pH) a pair of capacitors C1 (1 µF) and C2 (0.068 µF), and diodes D1, D2, D3, and D4. Diode D6 protects diode D4. Operation of the circuit (with the exception of D6) is described in detail in U.S. Pat. No. 6,115,273. Switch Z1 is switched in a known manner such that the output of pre-regulator 204 is a desired voltage, no matter what the input voltage is. The output is provided across a capacitor C5 (2000 µF) that provides a stable voltage source for the downstream convertor. Also, capacitor C5 prevents the voltage from being dangerously high and damaging switch Z1.

Then, switch Z1 is turned on, and current from inductor L1 begins to be directed through switch Z1. Switch Z1 applies a reverse voltage to inductor L2, causing its current to fall. Thus, the current (in this state) is decreasing through inductor L2 and increasing through switch Z1. Inductor L2 effectively limits or slows the current in switch Z1 at turn on until the switch voltage drops (to close to zero). Thus, the turn on has been a slow-current transition (SCT). Eventually all of the current from inductor L1 flows through switch Z1, and current in inductor L2 drops until it becomes zero, and then reverses. Capacitor C2 discharges through capacitor C1, diode D3, and inductor L2. Capacitors C1 and C2 allow diode D1 to turn off with a SVT, thus reducing losses. Inductor L2 effectively limits or slows the current in switch Z1 at turn on until the switch voltage drops (to close to zero). Thus, the turn on has been a slow-current transition (SCT). Capacitors C1 and C2 allow diode D1 to turn off with a SVT, thus reducing losses. Capacitor C2 discharges to about zero volts, and diode D4 begins to conduct. When diode D4 conducts, inductor L2 releases the energy stored therein to capacitor C1. The voltage energy on capacitor C1 is transferred to current in inductor L2, and then to voltage on capacitor C2. When the charge transfer is complete, and current ceases to flow in snubber inductor L2, the snubber is reset, and current in inductor L1 increases through switch Z1.

The circuit remains in this state until the switch is turned off. When switch Z1 is turned off current is diverted through diode D4 and into capacitor C2 (arrow 1001). Capacitor C2 provides the SVT time for switch Z1, thus a soft switching off is provided. The voltage on capacitor C1 eventually begins to reestablish the current in inductor L2. The voltage on capacitor C2 continues to rise until the current from inductor L1 not taken by inductor L2 is diverted through diode D3. The voltage on capacitor C1 continues to increase the current in inductor L2.

Eventually all of the current from inductor L1 flows through inductor L2, and current through diodes D3 and D4 ceases. Capacitor C1 continues to give energy to the bus. When all of the energy on capacitor C1 is expended (to the bus) current flows from inductor L1 to inductor L2, and through diode D1. This is the state initially described, and the cycle repeats.

Thus, the voltage rise across switch Z1 was slowed by capacitor C2 to allow the current to drop when switch Z1 was turned off. The current rise in switch Z1 was slowed by inductor L2 to allow the voltage to drop, when switch Z1 was turned on. Moreover, diode D1 was soft-switched by capacitors C1 and C2.

Diode D6 is not taught in the prior art. Diode D6 charges capacitor C2 as capacitor C1 discharges. This allows diode D4 to stay off, and the switch does not need to turn on. Without diode D6 diode D4 can fail, particularly at high power with a three phase input.

Numerous modifications may be made to the present disclosure which still fall within the intended scope hereof. Thus, it should be apparent that there has been provided a method and apparatus for providing welding type power with soft switching while protecting components that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A method of providing welding type power, comprising:
   pre-regulating an input line voltage to provide a dc bus; and
   converting the dc bus to a welding type output;
   wherein the pre-regulating includes slow voltage transition and slow current transition switching a boost convertor, including
   maintaining a boost converter switch off, and allowing current to flow through a boost inductor, a snubber inductor, and a first diode, to the dc bus;
   turning the boost converter switch on and diverting current from the snubber inductor to the boost converter switch;
   reversing the current in the snubber inductor;
   discharging a second capacitor through a third diode, a first capacitor, and the snubber inductor, thereby transferring energy from the second capacitor to the snubber inductor;
   diverting current through a fourth diode, the third diode and the first capacitor when the second capacitor is discharged, thereby transferring energy from the snubber inductor to the first capacitor;
   allowing the voltage on the second capacitor to rise until current begins to flow from the snubber inductor to the first capacitor;
   diverting current from the second capacitor through the third diode to a second diode;
   allowing the current flowing from the boost inductor to the snubber inductor to increase until all of the current from the boost inductor flows into the snubber inductor;
   diverting current from the first capacitor through a sixth diode and the third diode such that the fourth diode remains off, thereby increasing the voltage on the second capacitor;
   diverting current from the first capacitor to the first diode; and
   repeating slow voltage transition and slow current transition switching of the boost convertor.

2. The method of claim 1, wherein slow voltage transition and slow current transition switching a boost convertor includes slowing the boost converter switch voltage rise with a capacitor while the boost converter switch is turning of and slowing the boost converter switch current rise with an inductor while the switch is turning on.

3. The method of claim 2, wherein converting the dc bus includes inverting the dc bus to an ac signal, transforming the ac signal to a second ac signal, and rectifying the ac signal to produce a welding type signal.

4. The method of claim 3, wherein converting the dc bus further includes inverting the welding type signal to produce an ac welding type signal.

5. The method of claim 4, wherein preregulating further includes receiving the input line voltage and rectifying the input line voltage to produce a rectified input signal, and providing the rectified input signal to the boost converter.

6. A welding type power supply, comprising:
   means for pre-regulating the input line voltage to provide a dc bus; and
   means for converting the dc bus to a welding type output;
   wherein the pre-regulating includes means for slow voltage transition and slow current transition switching a boost convertor;
   wherein the means for slow voltage transition and slow current transition switching a boost convertor includes
   means for maintaining a boost converter switch of and allowing current to flow through a boost inductor, a snubber inductor, and a first diode, to the dc bus;
   means for turning the boost converter switch on and diverting current from the snubber inductor to the boost converter switch;
   means for reversing the current in the snubber inductor;
   means for discharging a second capacitor through a third diode, a first capacitor, and the snubber inductor, thereby transferring energy from the second capacitor to the snubber inductor;
   means for diverting current through a fourth diode, the third diode and the first capacitor when the second capacitor is discharged, thereby transferring energy from the snubber inductor to the first capacitor;
   means for allowing the voltage on the second capacitor to rise until current begins to flow from the snubber inductor to the first capacitor;
   means for diverting current from the second capacitor through the third diode to a second diode;
   means for allowing the current flowing from the boost inductor to the snubber inductor to increase until all of the current from the boost inductor flows into the snubber inductor;

means for diverting current from the first capacitor through a sixth diode and the third diode such that the fourth diode remains off, thereby increasing the voltage on the second capacitor; and means for diverting current from the first capacitor to the first diode.

7. The welding type power supply of claim 6, wherein the means for slow voltage transition and slow current transition switching a boost convertor further includes means for slowing the boost converter switch voltage rise with a capacitor while the boost converter switch is turning off, and slowing the boost converter switch current rise with an inductor while the boost converter switch is turning on.

8. The welding type power supply of claim 7, wherein the means for converting the dc bus includes means for inverting the dc bus to an ac signal, means for transforming the ac signal to a second ac signal, and means for rectifying the ac signal to produce a welding type signal.

9. The welding type power supply of claim 8, wherein the means for converting the dc bus further includes means for inverting the welding type signal to produce an ac welding type signal.

10. The welding type power supply of claim 9, wherein the means for preregulating further includes means for receiving the input line voltage and rectifying the input line voltage to produce a rectified input signal that is provided to the rectified input signal to the boost converter.

* * * * *